Sept. 27, 1966                    D. G. FAWKES                    3,275,289
                BUTTERFLY VALVE WITH FRUSTO-CONICAL METAL SEAT
Filed July 12, 1963                                      3 Sheets-Sheet 1
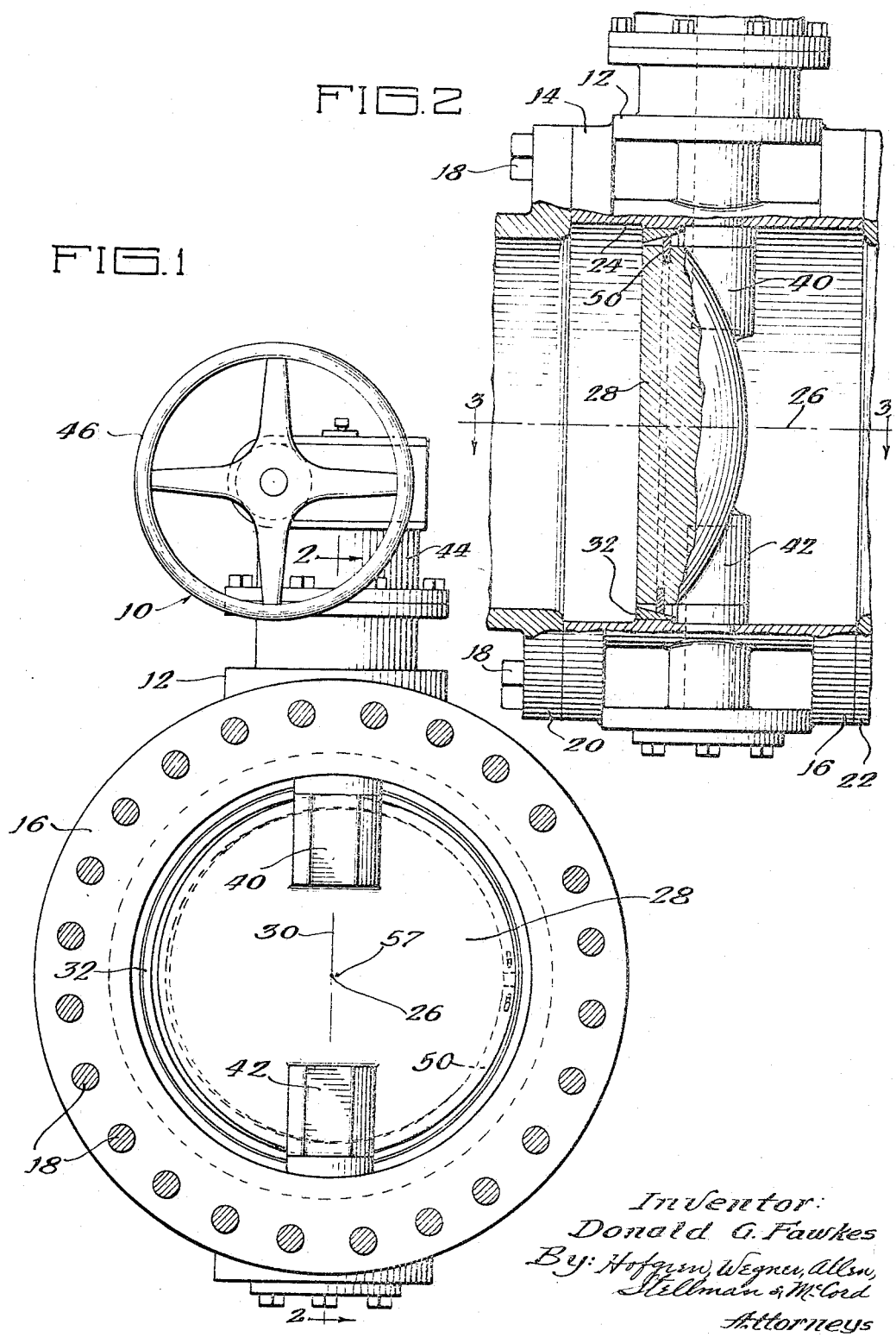
Inventor:
Donald G. Fawkes
By: Hofgren, Wegner, Allen,
Stellman & McCord
Attorneys Sept. 27, 1966  D. G. FAWKES  3,275,289
BUTTERFLY VALVE WITH FRUSTO-CONICAL METAL SEAT
Filed July 12, 1963  3 Sheets-Sheet 2
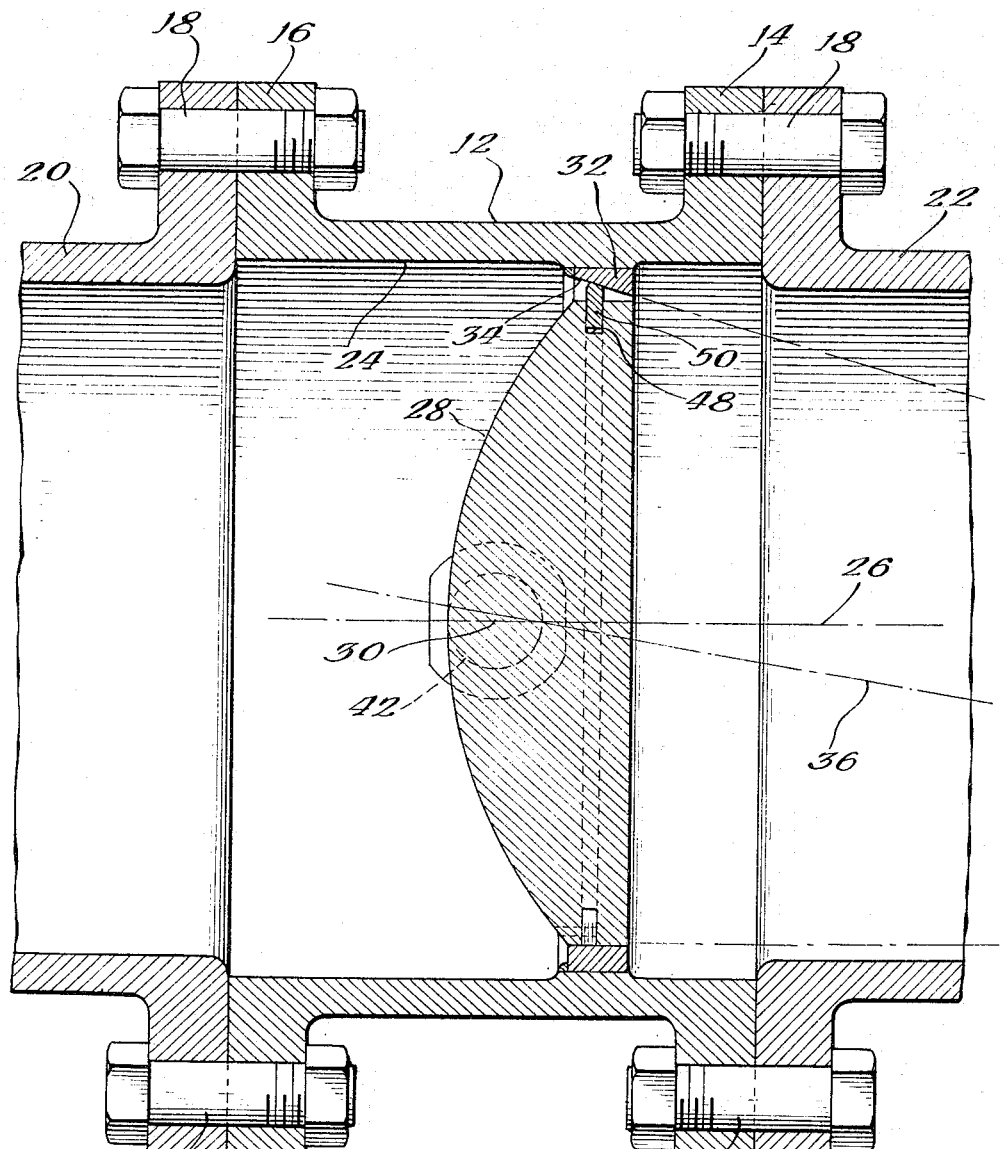
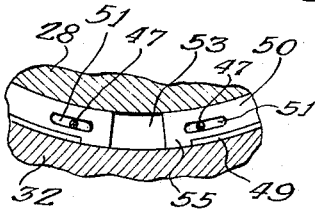

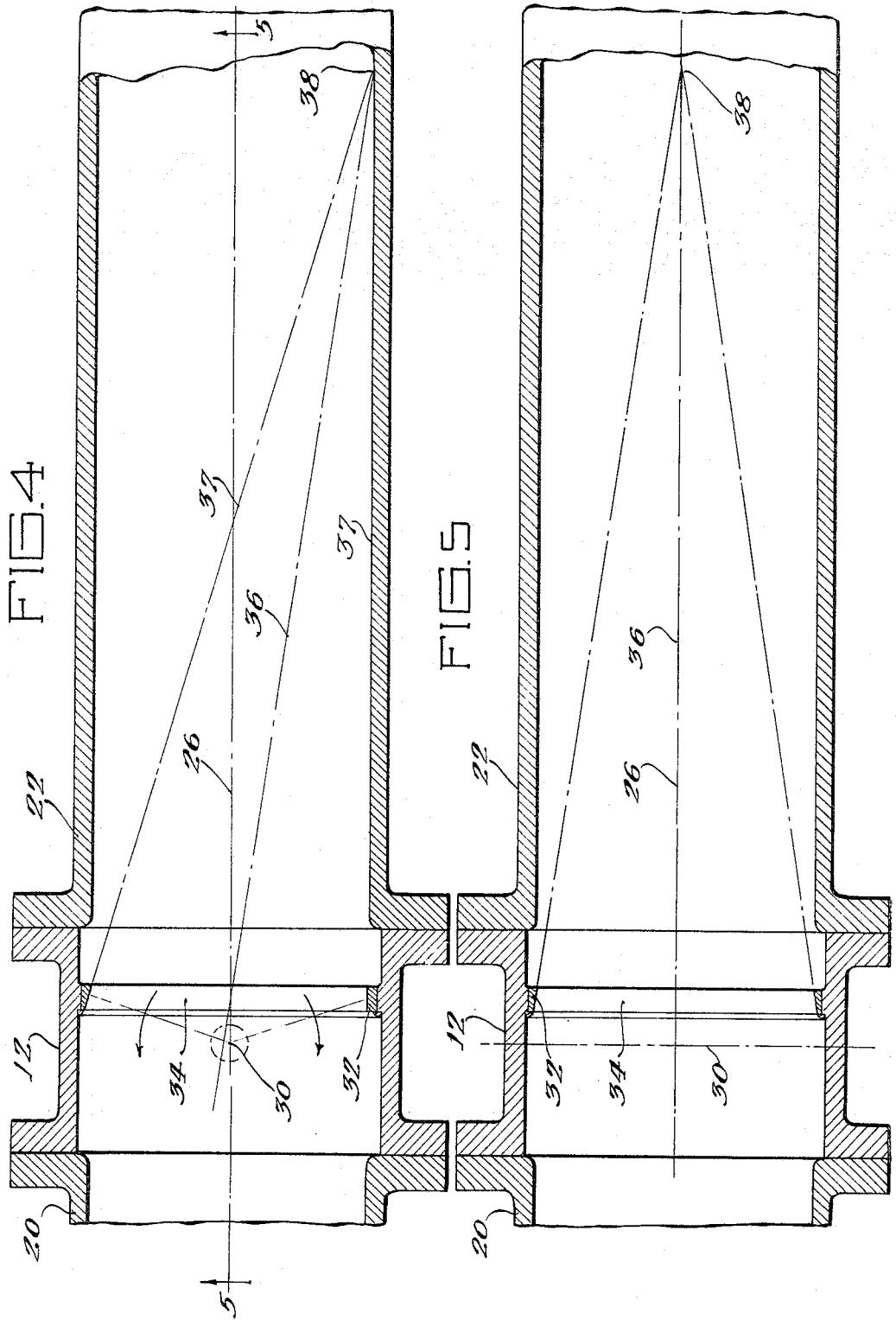

3,275,289
BUTTERFLY VALVE WITH FRUSTO-CONICAL
METAL SEAT
Donald G. Fawkes, Chicago, Ill., assignor to Henry Pratt
Company, a corporation of Illinois
Filed July 12, 1963, Ser. No. 294,569
8 Claims. (Cl. 251—306)

This invention relates to butterfly valves and more particularly to a novel seat and structure for closing such valves.

The valve of this invention comprises a valve housing a generally circular cylindrical bore about a center line providing a fluid passage through the housing, a valve seat surface formed in the housing, the surface having the shape of a frustum of a cone which has its axis at an angle to the center line of the cylindrical bore, and a closure member pivotally mounted in the housing for movement approximately 90° between the valve open and the valve closed positions.

Many butterfly valves utilizing fixed position metal seats have proved unsatisfactory in that they do not provide a sufficiently tight seal to stop leakage and at the same time allow the closure member to be easily opened without damaging or unduly wearing the valve seat and closure. The problem is especially keen in valves used in high temperature systems.

The valve of this invention provides a novel sealing structure. The valve may be manufactured in many sizes ranging through the popularly used pipe sizes in water service, manufacturing plants, test facilities, and the like.

The principal object of this invention is to provide a new and improved valve.

Another object of this invention is to provide a new and improved butterfly valve closing structure.

Another object is to provide a novel butterfly valve in which the mating parts of the closure and valve housing are so arranged that the closure is in effect lifted out of the seat of the valve upon movement toward opening from fully closed position.

A still further object of this invention is to provide a novel butterfly valve for use in high temperature service in which the mating parts of the closure and valve housing are metal and adapted for easy opening and closing of the valve.

Still another object is to provide a butterfly valve having a valve seat surface and a closure disc and a radially expansible sealing ring held for movement radially of the closure disc for engagement with the valve seat surface.

Further objects, features, and advantages of the present invention will be apparent from the following description of the preferred embodiment illustrated in the accompanying drawings, in which:

FIGURE 1 is an elevational view of a butterfly valve in closed position embodying the invention;

FIGURE 2 is a fragmentary sectional view taken along line 2—2 of FIGURE 1;

FIGURE 3 is an enlarged sectional view taken along line 3—3 of FIGURE 2;

FIGURE 4 is a diagrammatical sectional view showing the axis of the valve seat surface of the butterfly valve embodying this invention looking in the direction along the axis of rotation of the valve closure member;

FIGURE 5 is a diagrammatical sectional view taken along line 5—5 of FIGURE 4 showing the axis of the valve seat surface; and FIGURE 6 is a fragmentary sectional view showing the ends of the sealing ring.

The present invention generally involves a butterfly valve and is illustrated in a form including a valve operator shown generally at 10 and a valve housing 12 provided with flanges 14 and 16, one at each end of the housing. Flanges 14 and 16 both have openings therein so that the valve may be installed by use of bolts 18 and mating flange pipe such as 20 and 22 (FIGURE 3). Valve housing 12 may be made with any desirably formed or specially shaped ends to mate with suitable piping or other equipment. The housing 12 of the valve preferably is forced of metal, the illustrated embodiment being made of steel. The valve housing 12 may also be formed of cast metals and materials economical and suitable for use in the particular service for which the valve is intended.

The operator mechanism, shown generally at 10, is provided for opening and closing the valve and may be a gear box 44 and hand wheel 46 or a power actuated unit of known construction.

The valve housing 12 has a generally circular cylindrical bore 24 therein providing a fluid passage centered about a longitudinal center line 26. A closure, designated at 28, is pivotally mounted in housing 12 on an axis 30 normal to the valve center line 26 and spaced to one side of a valve seat 32. A valve seating surface on valve seat 32 has the shape of the surface of a frustum of a cone, the cone axis 36 forming an acute angle with the valve center line 26 in a plane normal to the axis of rotation 30 of closure 28, as shown in FIGURES 3 and 4. The apex of the cone is located on the surface of an imaginary cylinder about the longitudinal center line and illustrated in FIGURES 4 and 5 as the inner surface of the pipe section 22 to which the valve body 12 is bolted. The angle between the illustrated generatrix lines 37 (FIGURE 4) is about 20° or each makes an angles of 10° with the center line 36 of the cone. The position of the vertex 38 is in a plane perpendicular to the disc axis 30 and passing through the center line 26 of the valve.

In the valve illustrated, the frusto-conical seating surface 34 is the inner surface of a circular uninterrupted inwardly extending ring of metal welded to the inner wall of valve housing 12 and forming a portion of the conical surface of the imaginary cone illustrated in FIGURES 4 and 5 by the vertex, generatrix and cone center line. It is, of course, understood that the ring of metal forming a valve seat 32 may be integrally formed with the wall of the valve housing 12. The frusto-conical valve seating surface 34 generally is smooth and machined about the cone axis 36.

The closure 28 is rotatably mounted on stub shafts 40 and 42 for movement through approximately 90° between valve open and valve closed positions. The stub shafts 40 and 42 are supported in the housing 12 and generally arranged so that the shaft axis 30 extends diametrically of the housing for supporting the closure disc 28. The closure disc 28 remains in the flow path of the valve and is turned either across the valve bore 24 to close the valve or aligned with the flow through the valve bore 24 to open the valve. The shaft axis 30 which is the rotative axis of the closure disc 28, is offset with relation to the valve closure 28 so that the shafts 40 and 42 do not pierce or intersect the valve seating surface 34 or the circle of closure between the closure disc 28 and the valve seating surface 34.

The closure disc 28 is a one-piece metallic member having a circumferential groove 48 which receives a radially expansible discontinuous sealing ring 50 for engagement with the valve seating surface 34. The sealing ring 50 is retained in groove 48 by pins 47 which are received in slots 51 in the ends of the ring 50 so proportioned to allow the adjacent ends of the ring to abut one another. There is a small gap 53 between the ends of the discontinuous sealing ring 50. The ring has a chamfered edge 49 throughout its length except for short rectangular end portions 55 as seen in FIGURE 6. The sealing ring 50, shown in the drawings, is made of a metal alloy, however; it may be made of steel, plastic, or other suitable material which will satisfactorily withstand the temperature and pressure conditions in which the valve will be used, as well as to be inert to the fluid in the valve.

The sealing ring 50 has a normal circumference larger than the smallest circumference of the frusto-conical seating surface 34 and slightly smaller than the largest circumference of the seating surface 34 so that the ring 50 is constricted by the valve seating surface 34 when the closure disc 28 is rotated into valve closing position. It is intended that the ring be constricted by valve seating surface 34, so that the gap 53 disappears when the valve is closed. The gap 53 allows for expansion and contraction of the sealing ring 50 resulting from variations in temperature, however, the ends of the ring should abut when the valve is closed. The clearances shown in the drawings are much exaggerated for clearness of understanding and are not to scale.

When the valve is closed, there can be no leakage through the then non-existent gap 53. A further aid to preventing leakage at the area of the gap 53 is provided by seating the disc 28 against the valve seating surface 34 at a point adjacent the abutting ends of the ring 50. While theoretically disc 28 is tangent to the valve seating surface 34 only at a point on its circumference, in practice, a fluid-tight seal is obtained for a short distance extending to either side of the abutting ends of the ring 50. Thus, a fluid-tight seal is obtained throughout 360° by the cooperation of closure disc 28 and sealing ring 50 with the valve seating surface 34. The ring 50 provides a sealing contact throughout 360° with the valve seat.

The mounting of the closure disc 28 on an axis of rotation 30 which is removed longitudinally from the plane of the valve seat 32 provides a movement of the sealing ring 50 toward and away from the valve seating surface 34 as contrasted with a movement across that surface. Upon opening the valve, the sealing ring 50 is, in effect, lifted out of contact with the seating surface 34. Such action prolongs the life and efficiency of the mating parts. The valve seating surface 34, having the shape of a frustum of a cone which has its axis 36 at an acute angle with the valve center line 26 in a plane normal to the closure disc axis of rotation 30, also facilitates easy opening and closing of the valve and prolongs the service life of the sealing ring 50 and the valve seating surface 34.

While an illustrative embodiment of the invention is shown in the drawings and described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

I claim:

1. A butterfly valve, comprising: a valve housing having a fluid passage therethrough about a longitudinal center line; a closure disc rotatable in the housing about an axis normal to the center line between open and closed positions; and a valve seat in the housing having an inwardly facing annular surface for cooperatively contacting the periphery of the disc to close the valve when the disc is in closed position, said valve seat surface being spaced longitudinally of the center line from said disc axis and being generally centered about said center line, said seat surface having the shape of a part of a conical surface extending longitudinally of the center line away from the disc axis, the apex of the cone being located laterally of the center line so that the seat surface is asymmetrical about the center line and the closure disc may be wedged into the valve seat surface upon closing motion.

2. A butterfly valve, comprising: a valve housing having a fluid passage therethrough and about a longitudinal center line; a valve seat in the housing in a plane generally normal to the center line and having an inner surface; a valve disc rotatably mounted in the valve housing for cooperation with said valve seat surface, said disc having an axis of rotation normal to said center line and spaced longitudinally from the plane of said valve seat; said valve seat surface being a section of a conical surface having an axis passing through the center line in the plane of the valve seat and diverging from the center line at an acute angle and lying in a plane normal to the axis of rotation of said valve closure disc whereby the closure disc may be wedged against the valve seat surface to provide tight sealing contact therebetween.

3. A butterfly valve, comprising: a metal valve body having a circular cylindrical passage for fluid therethrough symmetrical about a longitudinally extending center line through the valve; an annular valve seat extending inwardly of said passage intermediate the ends of the valve body and having an inner valve seat surface for cooperation with a valve closure; a valve closure disc rotatably mounted in the valve body beside said valve seat and about an axis normal to said center line, said closure disc including a peripheral portion spaced from said axis a distance to engage said valve seat surface throughout 360° to close said valve and to be turned about said axis approximately 90° therefrom out of contact with said seat to open the valve, said valve seat surface being formed and having a shape to lay upon the surface of a cone having an axis passing through the center of the valve seat at said longitudinal center line and lying in a plane passing through said center line perpendicular to said closure axis with the cone axis having an angle of incidence to said center line of about 10°.

4. A butterfly valve, comprising: a housing having a wall defining a cylindrical fluid flow passage through the valve, said passage having a longitudinal center line; a closure disc mounted on an axis normal to said center line for selectively closing said passage; and a valve seat having an annular seating surface in said passage, said surface having the configuration of a frustum of a right circular cone defined by passing two spaced parallel planes through a right circular cone at an angle to the base of said cone and perpendicular to a generatrix of said cone, said frustum surface being located in the housing with said generatrix in a plane normal to said disc axis, said axis being mounted to one side of said valve seat so that said surface faces said axis.

5. A butterfly valve, comprising: a valve housing having a longitudinal center line; a frusto-conically shaped valve seat surface in said housing, the conical surface including a seat having a center line at an acute angle to the longitudinal center line of said housing; and a closure disc pivotally mounted in said housing on an axis normal to the longitudinal center line of said housing and to one side of said valve seat so that said seat surface faces said axis, said closure disc extending across said valve seat surface to close the valve and being swingable approximately 90° away from said valve seat surface to open the valve.

6. A butterfly valve, comprising: a housing having a cylindrical bore about a longitudinal center line to provide a fluid passageway therethrough; a closure disc mounted on an axis normal to said center line for selectively opening and closing said passageway; and an annular valve seating surface in said bore having the configuration of the frustum of a cone, the axis of said cone being at an angle to the center line of said cylindrical bore, said angle being such that said seating surface has a portion of its surface parallel to the longitudinal center line of said bore.

7. A butterfly valve, comprising: a housing having a wall defining a fluid flow passage, said passage having a longitudinal center line; a closure disc rotatably mounted on an axis normal to said center line for selectively closing said passage, said disc having a circumferential groove; a valve seat in said passage and having an annular seating surface, said surface having the configuration of the frustum of a right circular cone defined by passing two spaced parallel planes through the right circular cone at an angle to the base of said cone and normal to at least one element of the cone, the axis of said disc being positioned to one side of the seating surface so that said surface faces said axis; and a radially expansible discontinuous sealing ring held in the circumferential groove of said disc for movement radially of said disc in said groove for engagement with said valve seat surface.

8. A butterfly valve, comprising: a housing having a wall defining a fluid flow passage, said passage having a longitudinal center line; an annular valve seating surface in said passage having the configuration of the frustum of a cone, the center line of said cone being at an angle to the longitudinal center line of said passage, said angle being such that the seating surface has a portion of its surface parallel to the longitudinal center line of said passage; a closure disc having a circumferential groove rotatably mounted on an axis normal to the longitudinal center line of said passage for selectively closing said passage, said axis being offset to one side of said seating surface so that said surface faces said axis; and a sealing ring carried in the circumferential groove on said disc for engaging said seating surface, said ring having a normal circumference larger than the smallest circumference of said frusto-conical seating surface and slightly smaller than the largest circumference of said surface so that said ring is constricted by said seating surface when the closure disc is in valve closing position.

References Cited by the Examiner
UNITED STATES PATENTS

| | | | |
|---|---|---|---|
| 2,058,996 | 10/1936 | Kollberg | 251—306 |
| 2,586,927 | 2/1952 | Fantz | 251—306 |
| 2,840,338 | 6/1958 | Shaw | 251—306 |
| 2,853,267 | 9/1958 | Herren et al. | 251—307 X |
| 2,980,388 | 4/1961 | White | 251—298 X |
| 3,100,104 | 8/1963 | Moore | 251—307 X |

FOREIGN PATENTS 302,526  12/1928  Great Britain.

M. CARY NELSON, *Primary Examiner.*

S. SCOTT, *Assistant Examiner.*